Patented June 4, 1940

2,203,436

UNITED STATES PATENT OFFICE 2,203,436

MASTICATORY

Ferdinand A. Kertess, Briarcliff Manor, N. Y.

No Drawing. Application February 28, 1939,
Serial No. 259,063

3 Claims. (Cl. 99—135)

The invention relates to a masticatory and a process of producing the same.

The object of the invention is to provide a masticatory substance which can be produced from common materials and which has many advantages.

In order to give the teeth sufficient exercise to keep them healthy and also to hold flavoring or medicinal materials, masticatories must have a certain elasticity, and also a certain solidity or toughness, but on the other hand they should be gradually and uniformly dissolved. Of course the base material must be non-poisonous and innocuous to the body. Heretofore no chewing tablet has satisfactorily met these requirements, either because it does not have the necessary resistance to chewing or elasticity, or because it is not gradually soluble, so that the material contained therein is gradually liberated into the body.

An object of the present invention is to provide a masticatory which has the above qualities and which differs from the preparations previously used which were either too hard and brittle or too soft. A material according to the present invention has the proper resistance to mastication, dissolves uniformly and therefore gives off added materials uniformly, and can be stored without damage.

The material is produced by treating glue or glue-like substances, for example, vegetable or animal glues, gelatin, pectins and other proteinaceous glue-producing substances to hydrolize them. The hydrolysis may be carried out by heating, by the use of acids or alkalies, by digesting ferments or by any other process of hydrolysis. The hydrolysis is carried out until the glue-like substance no longer swells in aqueous solution, upon being dissolved therein. This causes a considerable reduction in the gelatinizing power of the glue-like substance. The product is then thoroughly mixed with glycerine, in the ratio of one to three parts of hydrolyzed glue-like substance to one part of glycerine.

The hydrolysis may be carried out in the same step in which the glycerine is added, or beforehand as may be desired.

The following examples show processes for carrying out the invention.

Example 1

500 g. of white glue are treated with 500 parts each of glycerine and potassium lye at 70° C. until complete solution occurs. Citric acid is added to bring the acidity of the mass to a pH of 5. The mass is then poured in a layer 5 mm. thick on glass plates coated with glycerine whereupon it solidifies. Any desired flavoring matter may be added during the process.

Example 2

250 g. of gelatine are digested with 150 g. of glycerine in an autoclave for 1½ hours at 120° C. The mass solidifies on cooling, and can be used as a base for chewing tablets. It may be liquified by heating to 70° C., after which any desired materials may be added and the liquid can be poured into forms.

Example 3

100 g. of gelatine and 100 g. of glycerine are heated with 50 g. of a dilute solution of licorice juice and menthol in a flask with a rising tube for 3 hours over a water bath. The resulting product is then cast in the form of bars.

While I have described herein some embodiments of my invention I wish it to be understood that I do not intend to limit myself thereby except within the scope of the appended claims.

I claim:

1. A masticatory comprising one to three parts of glue hydrolized to such a degree that it does not swell with water and one part of glycerine.

2. A masticatory comprising at least partially hydrolized glue which does not swell upon solution in water and glycerine.

3. The process of producing a masticatory which comprises hydrolizing one to three parts of glue until it does not swell upon solution in water and adding one part of glycerine thereto.

FERDINAND A. KERTESS.